United States Patent [19]

Taguchi

[11] Patent Number: 5,542,621
[45] Date of Patent: Aug. 6, 1996

[54] TAPE CASSETTE

[75] Inventor: Osamu Taguchi, Miyagi, Japan

[73] Assignee: Sony Corporation, Tokyo, Japan

[21] Appl. No.: 354,841

[22] Filed: Dec. 9, 1994

[30] Foreign Application Priority Data

Dec. 15, 1993 [JP] Japan ................................. 5-315524

[51] Int. Cl.$^6$ ............................................. G11B 23/087
[52] U.S. Cl. ............................................. 242/347.1
[58] Field of Search ........................... 242/347, 347.1; 360/132

[56] References Cited

U.S. PATENT DOCUMENTS

| | | | |
|---|---|---|---|
| 4,680,660 | 7/1987 | Ueda | 242/347.1 |
| 4,844,377 | 7/1989 | Shiomi et al. | 242/347.1 |
| 5,170,962 | 12/1992 | Iwahashi et al. | 242/347.1 |
| 5,395,064 | 3/1995 | Honsho et al. | 242/347.1 |
| 5,422,773 | 6/1995 | Ozaki et al. | 242/347.1 |

FOREIGN PATENT DOCUMENTS

| | | |
|---|---|---|
| 0389279A1 | 9/1990 | European Pat. Off. . |
| 0427476A2 | 5/1991 | European Pat. Off. . |
| 0501719A2 | 9/1992 | European Pat. Off. . |
| 0570132A2 | 11/1993 | European Pat. Off. . |

Primary Examiner—John P. Darling
Attorney, Agent, or Firm—William S. Frommer; Alvin Sinderbrand

[57] ABSTRACT

A tape cassette having a lid attached to its front surface portion so as to become openable and closable, the lid being composed of a front lid and a back lid and in which cam bosses provided on respective side portions of the back lid are guided along cam grooves formed on a cassette housing of the tape cassette to thereby open and close the lid when the lid is opened and closed. The tape cassette comprises a retaining member formed on the cassette housing in the vicinity of an upper end portion of the cam groove, wherein when the back lid is opened, the cam boss is brought in contact with the retaining member at the position in which an upper portion of the cam boss is projected from at least a lower surface of the retaining member, thereby preventing the cam boss from being disengaged from the cam groove.

7 Claims, 7 Drawing Sheets

TAPE CASSETTE

BACKGROUND OF THE INVENTION

The present invention relates to a tape cassette and, more particularly, to a lid for opening and closing a mouth portion of a tape cassette.

A tape cassette includes a lid to open and close a mouth portion of a front wall of a cassette housing. The lid of the tape cassette is composed of a front lid provided so as to open and close a front wall of a mouth portion, a top lid provided so as to open and close the upper portion of the front lid and a back lid provided at the rear portion of the front lid so as to become openable and closable.

Figure 1:
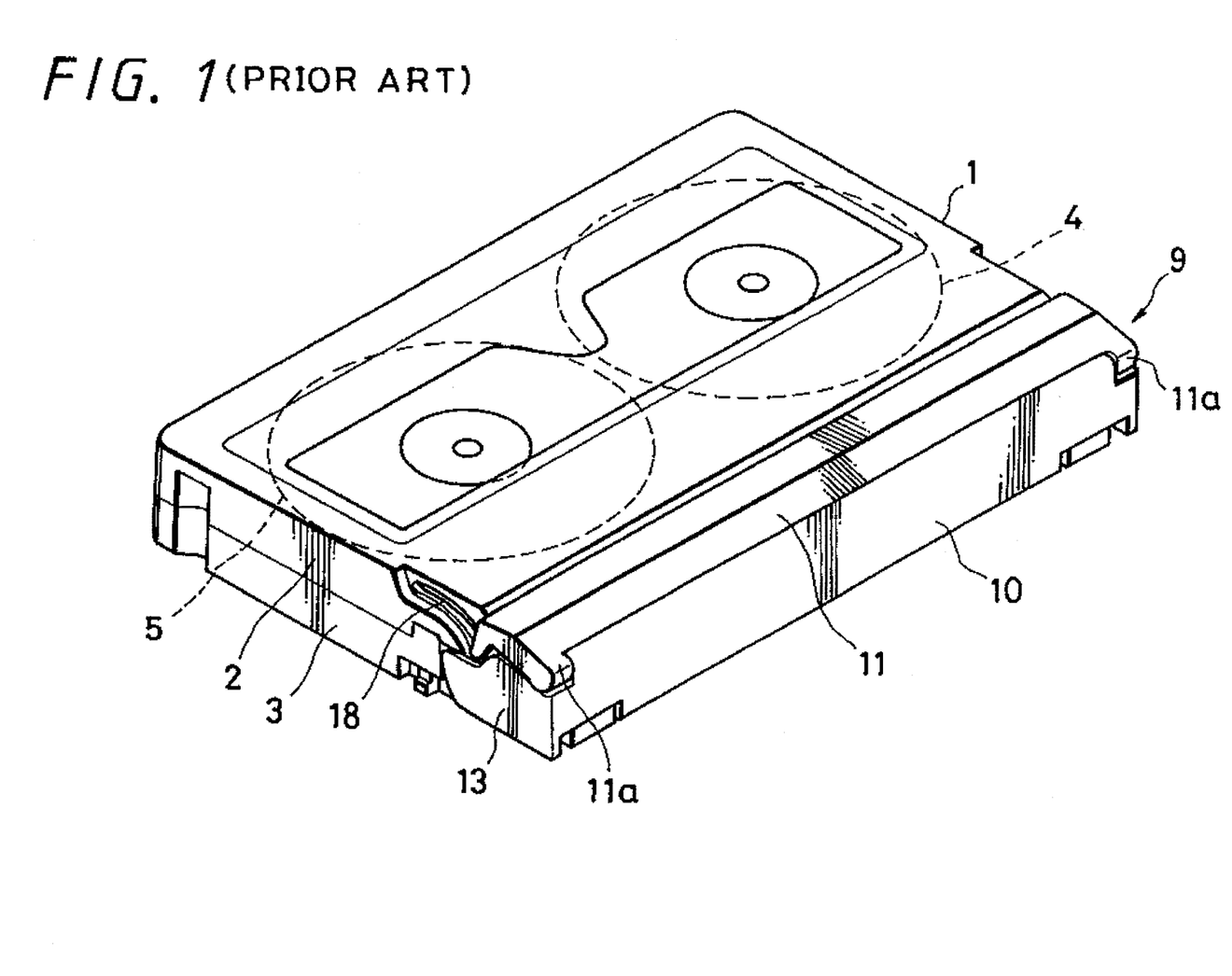
FIG. 1 is a perspective view showing a tape cassette having a lid composed of a front lid, a top lid and a back lid under the condition that the lid is closed.
Figure 2:
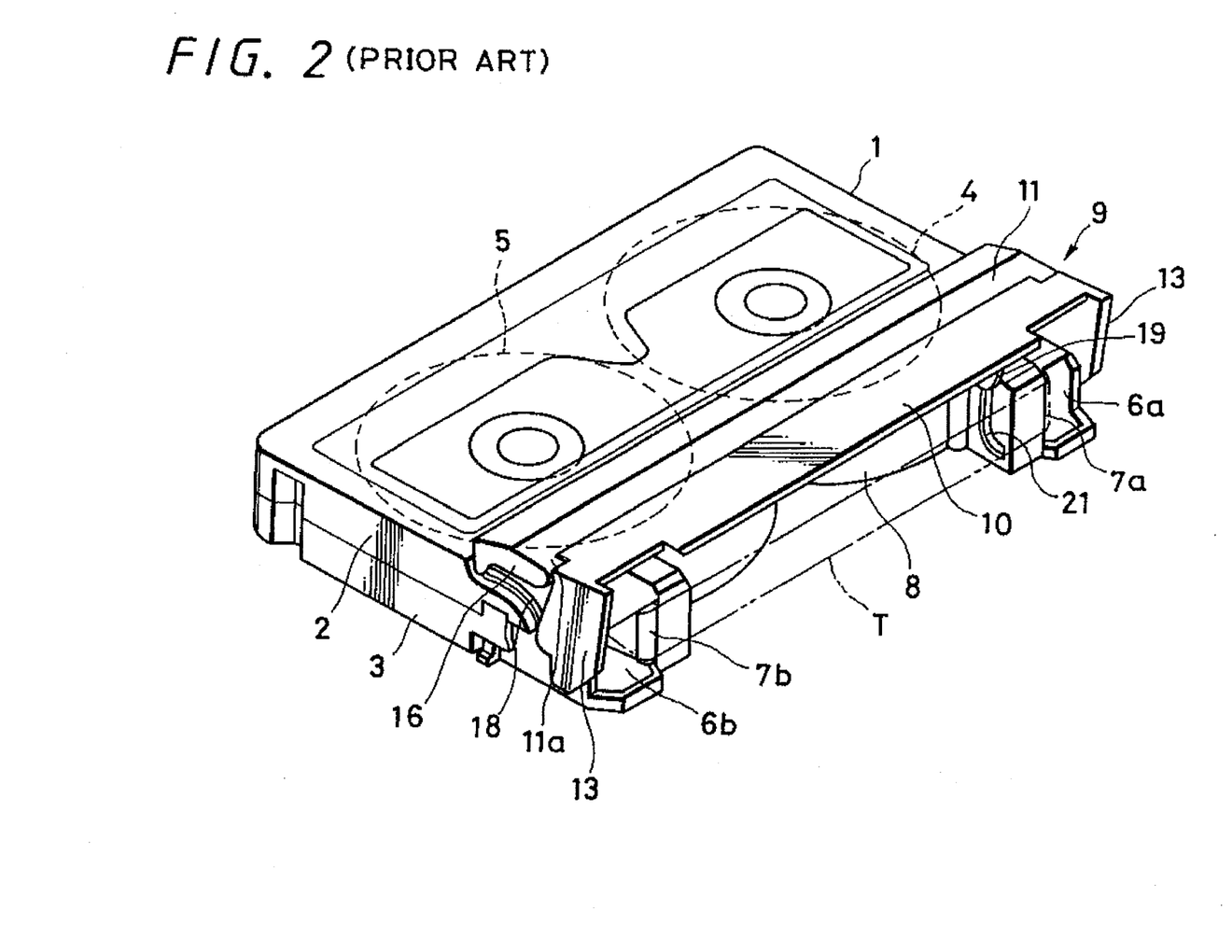
FIG. 2 is a perspective view showing the tape cassette with the lid being opened.
Figure 3:
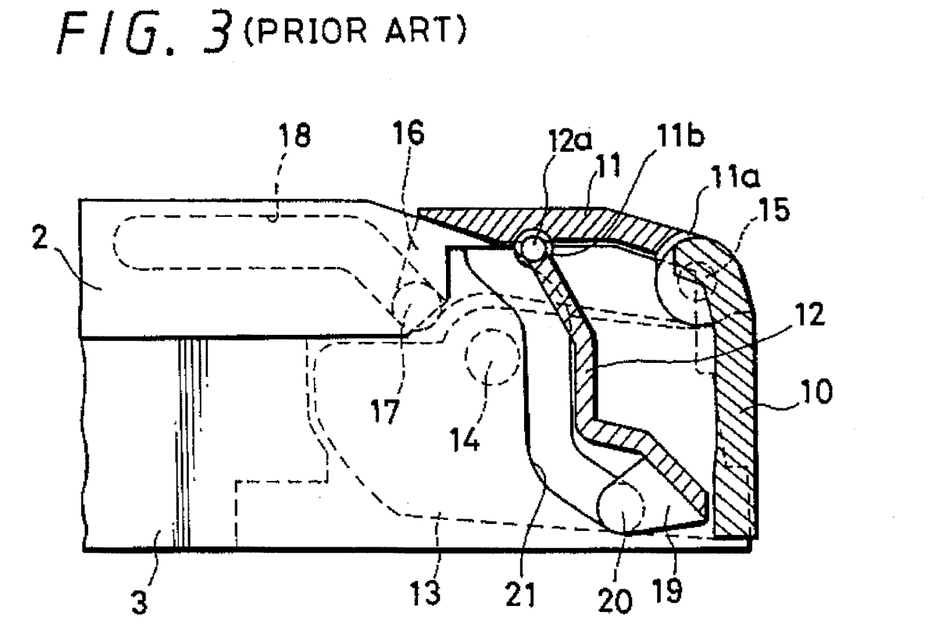
FIG. 3 is a cross-sectional view showing a lid portion presented under the condition that the lid is closed and to which reference will be made in explaining the problems that the tape cassette with the lid composed of three lids encountered.
Figure 4:
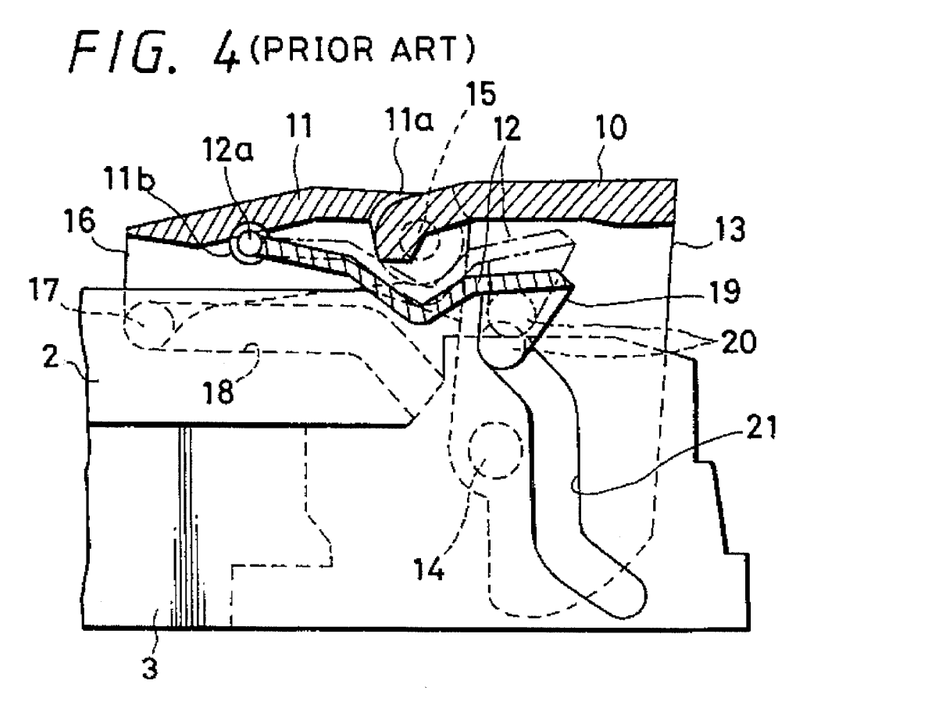
FIG. 4 is a cross-sectional view of a lid portion presented under the condition that the lid of the tape cassette shown in FIG. 3 is opened.

An arrangement of a tape cassette having a lid composed of three lids will be described with reference to FIGS. 1 to 4. FIG. 1 of the accompanying drawings is a perspective view showing a tape cassette with a lid being closed. FIG. 2 is a perspective view showing the tape cassette with the lid being opened. FIG. 3 is a cross-sectional view showing a lid portion provided under the condition that the lid is closed. FIG. 4 is a cross-sectional view showing the lid portion provided under the condition that the lid is opened.

As illustrated, a cassette housing 1 is composed of an upper half 2 and a lower half 3. The cassette housing 1 accommodates a tape supply reel 4 and a tape take-up reel 5 so that the tape supply reel 4 and the tape take-up reel 5 can be rotated freely. A tape T supplied from the tape supply reel 4 is guided by a tape guide 7a supported to one opening portion 6a and transported along a mouth portion 8 of a front surface of the cassette housing 1. Then, the tape T is guided by a tape guide 7b supported to the other opening portion 6b and wound around the tape take-up reel 5.

A lid 9 is supported to the opening portions 6a, 6b and the mouth portion 8 of the cassette housing 1 so as to become freely rotatable. When the lid 9 is closed, the tape T transported along the front surface of the cassette housing 1 can be protected from being damaged.

The lid 9 will be described below in detail. The lid 9 is composed of three lids, i.e., a front lid 10 disposed so as to close the opening portions 6a, 6b and the front surface of the mouth portion 8, a top lid 11 disposed so as to cover the opening portions 6a, 6b and the upper portion of the mouth portion 8 and a back lid 12 disposed at the rear side of the front lid 10 and the top lid 11 within the mouth portion 8.

An arrangement of the lid 9 will be described. The front lid 10 can be opened and closed when rotary shafts 14, 14 provided on side surface plates 13, 13 are rotatably supported to the outer side surfaces of the lower half 3.

The top lid 11 includes a bearings 11a, 11a disposed at both front end side portions thereof and the bearings 11a, 11a are supported by upper respective side portions and support point shafts 15, 15. The top lid 11 includes first cam bosses 17, 17 disposed on the rear end portions of side surface plates 16, 16. The first cam bosses 17, 17 are movably engaged with first cam grooves 18, 18.

The back lid 12 includes shaft pins 12a provided on the upper end portions thereof. The shaft pins 12a are supported to bearings 11b, 11b formed on the rear surface of the top lid 11. Second cam bosses 20, 20 provided on side surface plates 19, 19 of the lower end of the back lid 12 are movably engaged with second cam grooves 21, 21 formed on the inner side surfaces of the mouth portion 8 which is composed of the lower half 3. The upper end portions of the second cam grooves 21, 21 are elongated up to the upper end portion of the mouth portion 8.

In the tape cassette thus arranged, under the condition that the lid 9 is closed, as shown in FIG. 3, the tape T transported along the mouth portion 8 is sandwiched between the rear surface of the front lid 11 and the lower end portion of the back lid 12.

Opening operation of the lid 9 will be described. When the tape cassette is accommodated to the loading position within a cassette compartment, if the front lid 10 is elevated by a member (not shown), the front lid 10 is upwardly rotated about the rotary shafts 14, 14 so as to be opened. Also, the top lid 11 that is supported by the support point shafts 15, 15 of the front lid 10 is rearwardly moved from the front ends to the rear ends of the cam grooves 18, 18 when the first cam bosses 17, 17 are guided by the first cam grooves 18, 18 on the upper half 2. Further, concurrently with the rearward movement of the top lid 11, the back lid 12 that is supported by the top lid 11 and the shaft pins 12a, 12a is elevated from the lower ends to the upper ends of the second cam grooves 21, 21 when the cam bosses 20, 20 are guided by the second cam grooves 21, 21. Thus, the lid 9 is opened as shown in FIG. 4.

The same assignee of the present application has already filed Japanese patent applications Nos. 57-277302 and 06-027561 (corresponding U.S. patent applications also were filed) and Japanese patent application No. 05-280704 (corresponding U.S. patent application and European patent application also were filed).

The shape of the second cam groove 21 along which the cam boss 20 of the back lid 12 is moved is limited by a pressure angle presented when the cam boss 20 is moved and a clearance provided between the tape T and the back lid 12. In particular, in the tape cassette in which the cassette housing is reduced in thickness, if the pressure angle is inhibited from being increased, then under the condition that the lid 9 is opened as shown in FIG. 4, the lid 9 is stopped at the position in which a part of the cam boss 20 of the back lid 12 is projected from the upper end portion of the second cam groove 21.

With the above-mentioned arrangement of the tape cassette, if the lid 9 that is in the opened state is applied with too large force of external force, then it is frequently observed that the cam boss 20 of the back lid 12 is disengaged from the upper end portion of the cam groove 21 as shown by phantom lines in FIG. 4. There is then the problem that the lid 9 cannot be closed in the closing operation of the lid 9.

Figure 5:
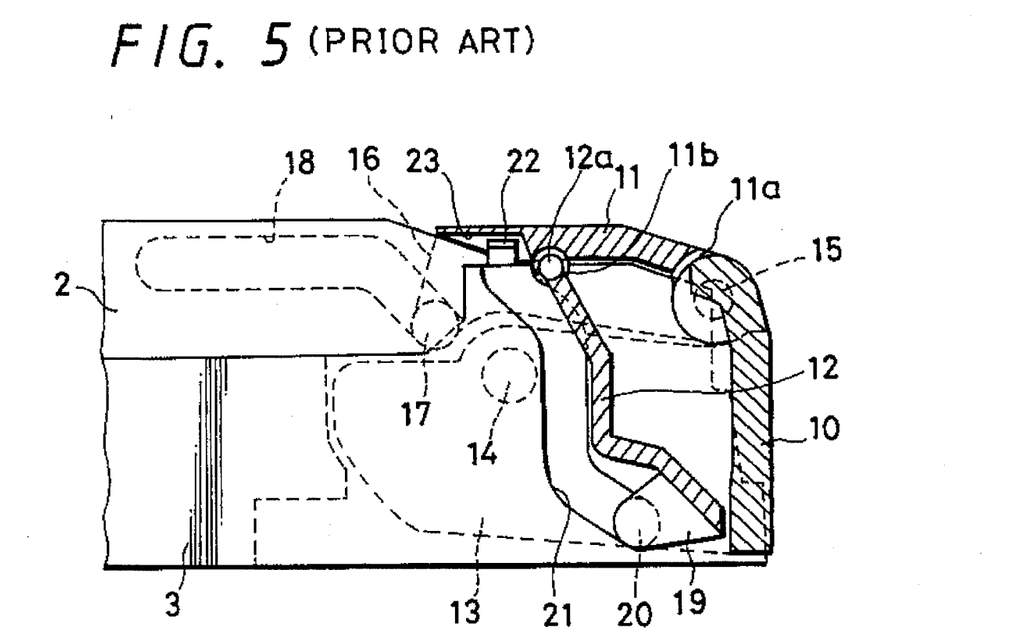
FIG. 5 is a cross-sectional view of a lid portion and to which reference will be made in explaining countermeasure means of the tape cassette shown in FIG. 3.
Figure 6:
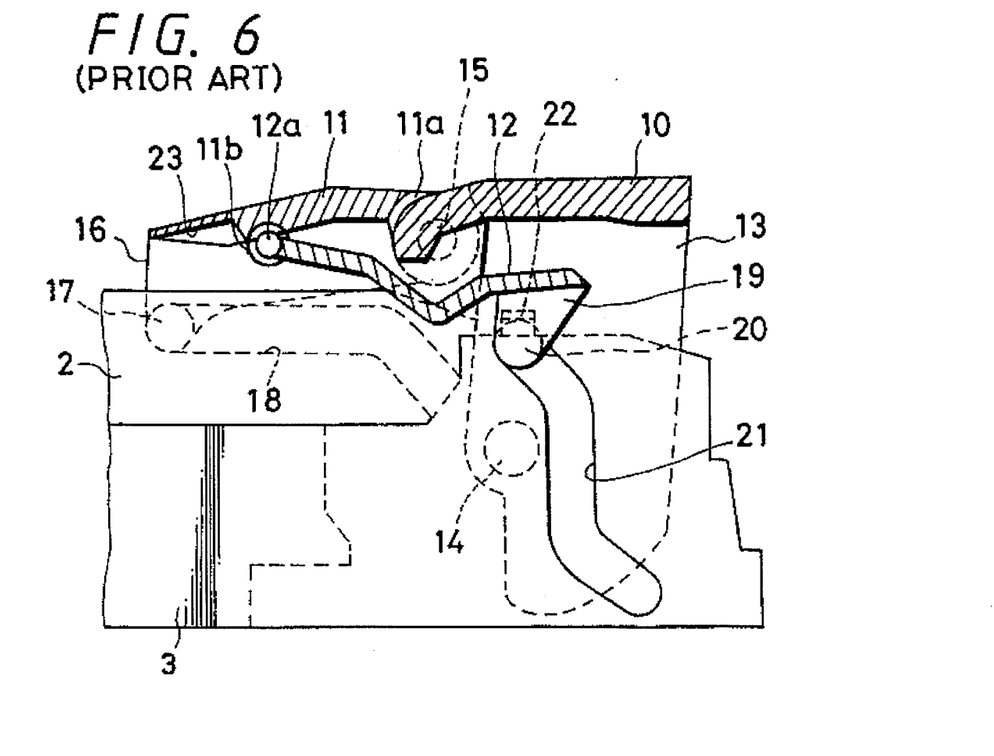
FIG. 6 is a cross-sectional view showing a lid portion presented under the condition that the lid of the tape cassette shown in FIG. 5 is opened.

To solve this problem, as shown in FIGS. 5 and 6, it is proposed that a retaining rib 22 is provided on the upper portion of the cam groove 21 in order to prevent the cam boss 20 from being disengaged from the upper end portion of the cam groove 21 when the back lid 12 is opened. When such retaining rib 22 is provided, an escape groove 23 has to be formed on the rear surface of the top lid 11 in order to prevent the rear surface of the top lid 11 from interfering with the retaining rib 22 under the condition that the lid 9 is closed.

However, the thickness of the retaining rib 22 should deliberately be set in order to avoid the occurrence of a problem that an escape portion becomes so-called short mold (flow of resin becomes insufficient) when the top lid 11 is formed by molding because the thickness of the top lid 11 at its escape portion is reduced by the escape groove 23 of the top lid 11. However, when a tape cassette is small in size, the thickness of the lid itself is comparatively thin and it is difficult to set the thickness of the retaining rib 22 to a proper thickness conforming to the preferable conditions.

SUMMARY OF THE INVENTION

In view of the aforesaid aspect, it is an object of the present invention to provide a tape cassette in which a retaining rib formed on a back lid for preventing a cam boss from being disengaged from a cam groove can be reduced in thickness satisfactorily even though the tape cassette is miniaturized and in which a strength of the back lid at the portion to which the retaining rib is opposed can be increased.

According to an aspect of the present invention, there is provided a tape cassette having a lid attached to its front surface portion so as to become openable and closable, the lid being composed of a front lid and a back lid and in which cam bosses provided on respective side portions of the back lid are guided along cam grooves formed on a cassette housing of the tape cassette to thereby open and close the lid when the lid is opened and closed. The tape cassette comprises a retaining member formed on the cassette housing in the vicinity of an upper end portion of the cam groove, wherein when the back lid is opened, the cam boss is brought in contact with the retaining member at the position in which an upper portion of the cam boss is projected from at least a lower surface of the retaining member, thereby preventing the cam boss from being disengaged from the cam groove.

DETAILED DESCRIPTION OF THE PREFERRED EMBODIMENTS

A tape cassette according to the embodiments of the present invention will be described below with reference to the drawings. A cassette housing and a lid structure of the present invention are the same as those of FIGS. 1 through 4. In FIGS. 7 to 12, like parts corresponding to those of FIGS. 1 to 6 are marked with the same references and therefore need not be described in detail.

Figure 7:
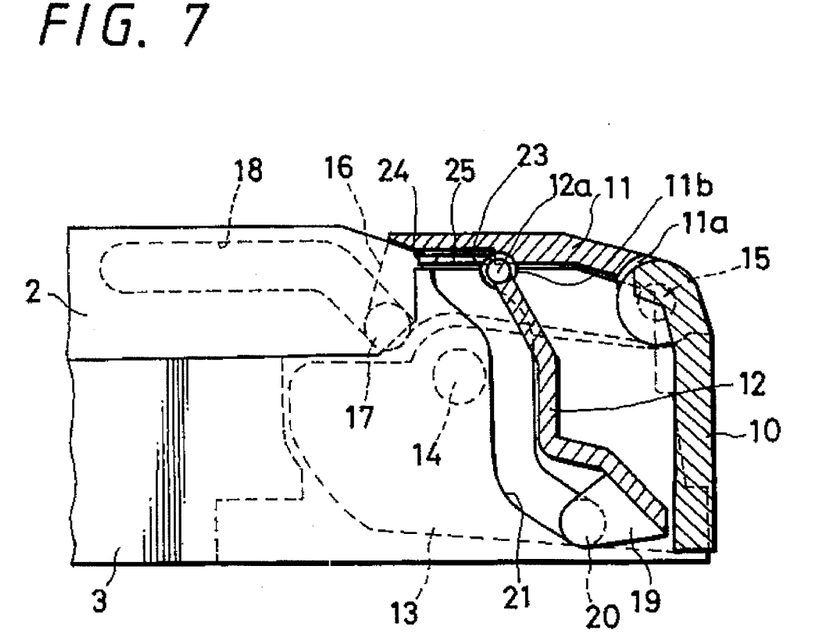
FIG. 7 is a cross-sectional view of a lid portion presented under the condition that a lid of a tape cassette according to an embodiment of the present invention is closed.
Figure 8:
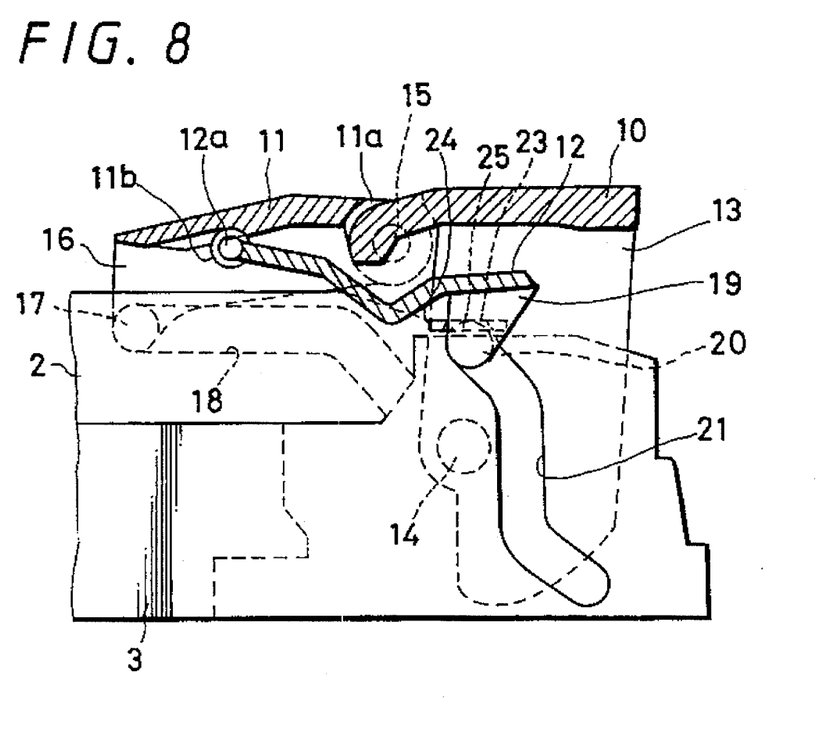
FIG. 8 is a cross-sectional view of the lid portion presented under the condition that the lid of the tape cassette according to the embodiment of the present invention is opened.
Figure 9:
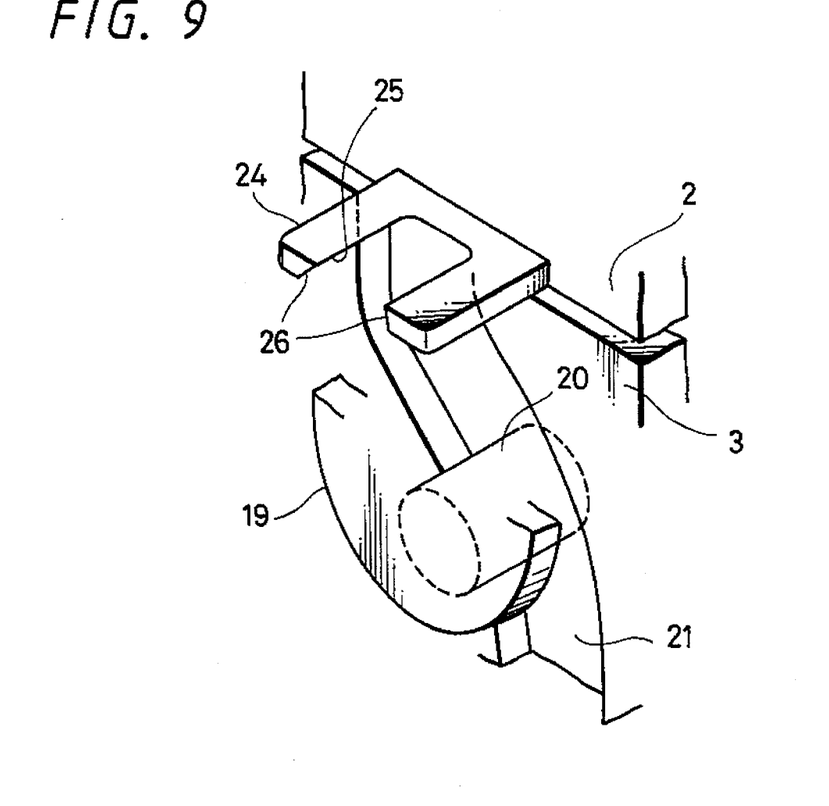
FIG. 9 is a perspective view showing a retaining rib which is a main portion of the present invention.
Figure 10:
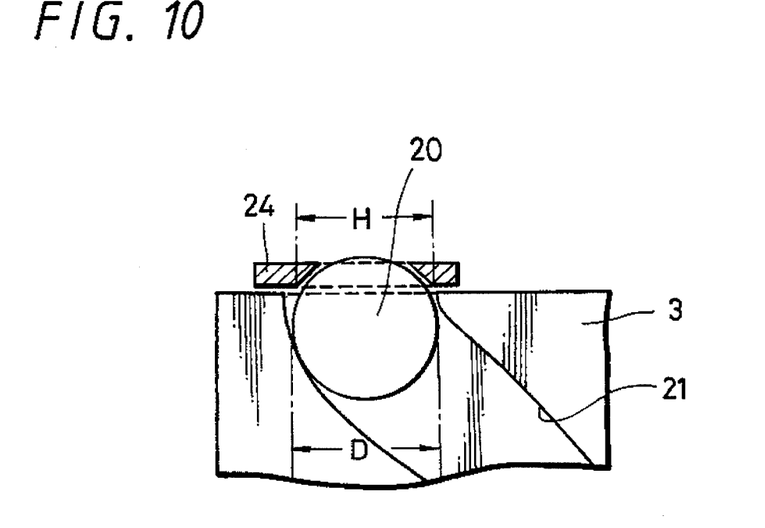
FIG. 10 is a cross-sectional view showing a retaining rib and a cam boss according to the present invention.

FIG. 7 is a cross-sectional view showing the tape cassette with the lid 9 being closed. FIG. 8 is a cross-sectional view showing the tape cassette with the lid 9 being opened. FIG. 9 is a perspective view showing the second cam groove 21 and the back lid 12. FIG. 10 is an enlarged view showing a cam boss position and the cam groove of the back lid under the condition that the back lid is opened.

The most specific feature of the present invention lies in that a retaining rib 24 for preventing the cam boss 20 from being disengaged is provided on the upper end portion of the second cam groove 21 along which the cam boss 20 is moved when the back lid 12 is opened and closed.

The arrangement of the retaining rib 24 will be described more fully. The retaining rib 24 having a predetermined thickness is extended from the upper half 2 constructing the mouth portion 8 to the upper end portion of the second cam groove 21. The retaining rib 24 has an opening groove 25 whose tip end side is cut away. The groove end portions of the opening groove 25 are formed as tapered surfaces 26, 26 in which a lower edge side is increased in width and an upper edge side is reduced in width. A groove width H of the lower edge side is formed to be a little smaller than a width D of a diameter of the above-mentioned cam boss 20.

As described above, according to the present invention, the above-mentioned retaining rib 21 is formed on the upper end portion of the cam groove 21 along which the cam boss 20 of the back lid 11 is moved. Therefore, when the lid 9 is opened as shown in FIG. 8 from the closed state shown in FIG. 7, the cam boss 20 is brought in contact with the tapered surfaces 26, 26 under the condition that the upper surface portion of the cam boss 20 is slightly projected from the upper surface side of the opening groove 25 of the retaining rib 24, thereby preventing the cam boss 20 from being disengaged from the cam groove 21.

Specifically, the cam boss 20 can be prevented from being disengaged from the cam groove 21 in the so-called overlap state that the upper surface portion of the cam boss 20 is projected to the upper surface of the retaining rib 24 as the retaining rib 24. Thus, even when the thickness of the retaining rib 24 is relatively increased, it is possible to reduce the height of the retaining rib 24. Therefore, it is possible to reduce a concave amount of the escape groove 23 formed on the rear surface of the top lid 11 to which the retaining rib 24 is opposed under the condition that the lid 9 is closed as shown in FIG. 7. Thus, the thickness of the escape groove 23 of the top lid 11 can be prevented from being decreased to the extent that the escape groove 23 portion cannot be molded. Therefore, the strength of the top lid 11 can be increased.

Figure 11:
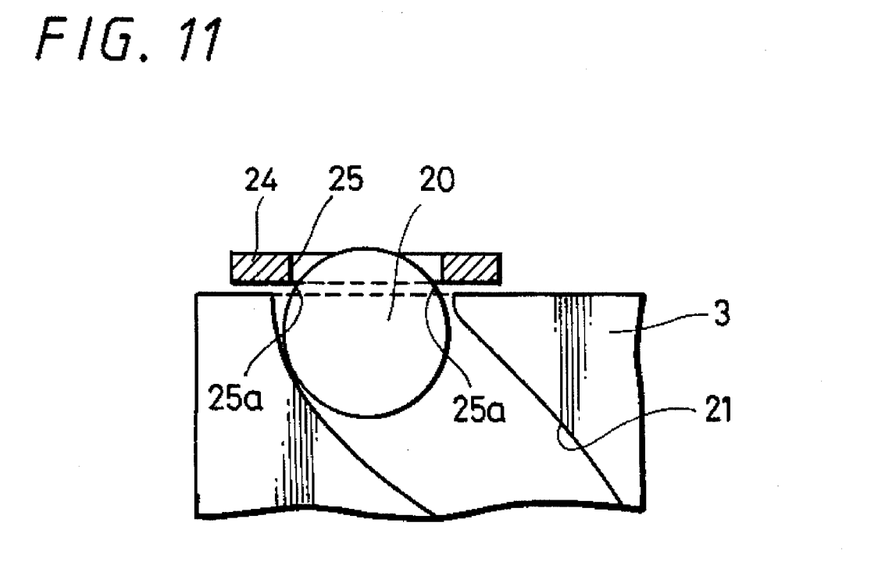
FIG. 11 is a cross-sectional view showing a modified example of the retaining rib in an enlarged scale.
Figure 12:
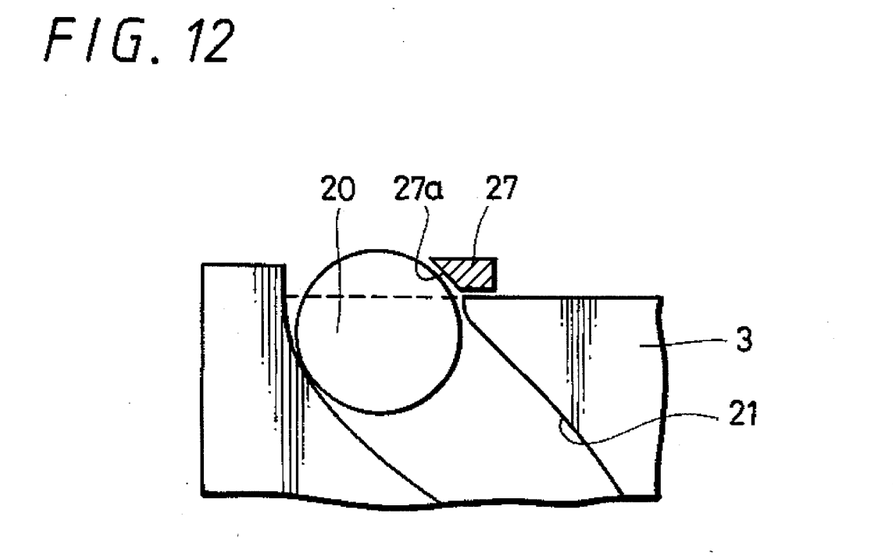
FIG. 12 is a cross-sectional view showing another modified example of the retaining rib in an enlarged scale.

A modified example of the present invention of the retaining rib 24 will be described with reference to FIG. 11. According to this modified example, as shown in FIG. 11, no tapered surfaces 26, 26 are formed on the opening groove 25 of the retaining rib 24 but the opening groove 25 is formed as an opening edge in the vertical state. Then, the cam boss 20 is brought in contact with corner portions 25a, 25a formed on the lower edge sides of the opening groove 25 with similar action and effects to those of the above-mentioned embodiment being achieved. A second modified example of FIG. 10 will be described with reference to FIG. 12. As shown in FIG. 12, a retaining rib is formed as a one-side rib 27 having a tapered surface 27a and this one-side rib 27 can prevent the cam boss 20 from being disengaged from the cam groove 21 with similar action and effects being achieved.

In any one of the embodiment and the modified examples, the upper portion of the cam boss 20 is brought in contact with the retaining rib to prevent the cam boss 20 from being disengaged from the cam groove 21 under the condition that the upper portion of the cam boss 20 is projected to the upper portion from the lower surface of the retaining rib.

While the tape cassette of the present invention includes the lid composed of three lids as described above, the present invention is not limited thereto and can be widely applied to 8-mm video tape cassette using a lid composed of two lids.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape cassette having a lid attached to its front surface portion so as to become openable and closable, said lid being composed of a front lid and a back lid and in which cam bosses provided on respective side portions of said back lid are guided along cam grooves formed on a cassette housing of said tape cassette to thereby open and close said lid, said tape cassette comprising:

a retaining member formed on said cassette housing in the vicinity of an upper end portion of said cam groove, wherein when said back lid is opened, said cam boss is brought in contact with said retaining member at a position in which an upper portion of said cam boss is projected from at least a lower surface of said retarding member, thereby preventing said cam boss from being disengaged from said cam groove, and wherein said retaining member has a tapered surface on which said retaining member is brought in contact with said cam boss.

2. A tape cassette according to claim 1, wherein said tapered surface is curved.

3. A tape cassette according to claim 2, wherein a curve of said tapered surface is substantially equal to a curve of a columnar portion of said cam boss.

4. A tape cassette according to claim 3, wherein said retaining member is formed of two portions.

5. A tape cassette according to claim 4, wherein said retaining member is an opening groove from which the upper portion of said cam boss is projected.

6. A tape cassette according to claim 5, wherein the tape cassette is formed of an upper half and a lower half and said retaining member extends from said upper half.

7. A tape cassette according to claim 6, further comprising a top lid for opening and closing a tape in unison with said front lid and said back lid and wherein an escape groove is formed which is generally concave-shaped and in opposed relation to said retaining member at a position in which said lid is closed.

* * * * *